(12) United States Patent
Chandrasekar et al.

(10) Patent No.: US 7,756,864 B2
(45) Date of Patent: Jul. 13, 2010

(54) SYSTEM AND METHOD FOR PERFORMING A SEARCH AND A BROWSE ON A QUERY

(75) Inventors: Raman Chandrasekar, Seattle, WA (US); James Charles Finger, II, Kirkland, WA (US); Sally K. Salas, Issaquah, WA (US); Eric Benjamin Watson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 494 days.

(21) Appl. No.: 11/274,598

(22) Filed: Nov. 14, 2005

(65) Prior Publication Data

US 2006/0074891 A1 Apr. 6, 2006

Related U.S. Application Data

(63) Continuation of application No. 10/037,993, filed on Jan. 3, 2002, now Pat. No. 6,978,264.

(51) Int. Cl.
*G06F 17/30* (2006.01)
*G06F 7/00* (2006.01)

(52) U.S. Cl. .................... 707/722; 707/3; 707/5; 707/102

(58) Field of Classification Search ............. None
See application file for complete search history.

(56) References Cited

U.S. PATENT DOCUMENTS

| | | | |
|---|---|---|---|
| 5,675,819 A | 10/1997 | Schuetze | 395/760 |
| 5,721,897 A | 2/1998 | Rubinstein | 295/602 |
| 5,724,571 A | 3/1998 | Woods | 395/605 |
| 5,812,134 A * | 9/1998 | Pooser et al. | 715/848 |
| 6,006,225 A | 12/1999 | Bowman et al. | 707/5 |
| 6,233,575 B1 * | 5/2001 | Agrawal et al. | 707/6 |
| 6,233,584 B1 | 5/2001 | Purcell | 707/103 X |
| 6,240,408 B1 | 5/2001 | Kaufman | 707/3 |
| 6,253,198 B1 | 6/2001 | Perkins | 707/3 |
| 6,253,201 B1 | 6/2001 | Abdel-Mottaleb et al. | 707/4 |
| 6,263,335 B1 | 7/2001 | Paik et al. | 707/5 |
| 6,278,992 B1 | 8/2001 | Curtis et al. | 707/3 |
| 6,282,538 B1 | 8/2001 | Woods | 707/5 |
| 6,526,440 B1 | 2/2003 | Bharat | 709/219 |
| 6,529,903 B2 | 3/2003 | Smith et al. | 707/7 |
| 6,578,022 B1 | 6/2003 | Foulger et al. | 706/45 |
| 6,581,072 B1 | 6/2003 | Mathur et al. | 707/104.1 |

(Continued)

OTHER PUBLICATIONS

Brin, S. et al., "The Anatomy of a Large-Scale Hypertextual Web Search Engine", *The Anatomy of a Search Engine*, Aug. 7, 2000, http://www7.scu.edu.au/programme/fullnapers/1921/com1921.htm, 18 pages.

*Primary Examiner*—Sathyanarayan Pannala
(74) *Attorney, Agent, or Firm*—Woodcock Washburn LLP

(57) ABSTRACT

A search and a browse on a single user query is performed. A refined query is selected from the results of the first user query. Thereafter, a list of concepts from a first directory associated with the refined query is obtained. The concepts are defined in a hierarchical relationship with concepts having broader scope being higher in the hierarchy and concepts having a narrower scope being lower in the hierarchy. Additionally, a list of web sites associated with the search concept is obtained from a second directory.

20 Claims, 14 Drawing Sheets

U.S. PATENT DOCUMENTS

| | | | |
|---|---|---|---|
| 6,615,209 B1 | 9/2003 | Gomes et al. | 707/5 |
| 6,658,423 B1 | 12/2003 | Pugh et al. | 707/102 |
| 6,678,681 B1 | 1/2004 | Brin | 707/6 |
| 6,978,264 B2 | 12/2005 | Chandrasekar et al. | 707/3 |
| 2002/0040363 A1* | 4/2002 | Wolfman et al. | 707/5 |
| 2002/0065671 A1* | 5/2002 | Goerz et al. | 705/1 |
| 2002/0120619 A1* | 8/2002 | Marso et al. | 707/3 |
| 2002/0123988 A1 | 9/2002 | Dean et al. | 707/3 |
| 2002/0133481 A1 | 9/2002 | Smith et al. | 707/3 |

* cited by examiner

| | |
|---|---|
| NODE ID# | 202 |
| TITLE | 204 |
| LONG TITLE | 206 |
| KEYPHRASE ID # | 207 |
| DESCRIPTION | 208 |
| APPROVAL SETTING | 210 |
| PARENT NODE # | 212 |
| CHILD NODE # | 214 |
| POPULARITY | 216 |
| OVERRIDE WEB DIRECTORY/ FALLTHROUGH | 218 |
| CATEGORY LINKS | 220 |

| | |
|---|---:|
| CONCEPT (TITLE) | 302 |
| KEY PHRASES | 304 |
| CORE KEY PHRASE - WEB DIRECTORY 306a<br>CORE KEY PHRASE - FALLTHROUGH 306b | 306 |
| ASSOCIATED WEB SITES | 308 |
| KEY PHRASE WEIGHTS | 310 |
| CONCEPT DISPLAY NAME | 312 |
| CONCEPT ID# | 314 |
| OVERRIDE WEB DIRECTORY  316a<br>OVERRIDE FALLTHROUGH  316b | 316 |

300

| NUM 702 | CONTEXT | 302 |
|---|---|---|
| NUM 702a | KEY PHRASE 1 | 304a |
| NUM 702b | KEY PHRASE 2 | 304b |
| | | |
| NUM 702n | KEY PHRASE n | 304n |

FIGURE 7

SYSTEM AND METHOD FOR PERFORMING A SEARCH AND A BROWSE ON A QUERY

CROSS-REFERENCE TO RELATED CASES

This application is Continuation of U.S. patent application Ser. No. 10/037,993, filed Jan. 3, 2002, which is related by subject matter to U.S. patent application Ser. No. 09/682,040, filed on Jul. 12, 2001, entitled "System and Method for Query Refinement to Enable Improved Searching Based on Identifying and Utilizing Popular Concepts Related to User's Queries."

FIELD OF THE INVENTION

This invention relates generally to searching for relevant data entities using a communications network such as the Internet. In particular, the invention relates to a technique that combines the functionality of a search based on a key word or words and a browse based on categories for a query, thereby enabling a user to receive better results for a query.

BACKGROUND

The Internet contains a vast amount of information, distributed over a multitude of computers connected by "The Net", hence providing users with large amounts of information on any topic imaginable. Although large amounts of information are available, however, finding the desired information is not always easy or fast.

Search engines have been developed to address the problem of finding desired information on the Internet. Typically a user who has an idea of the type of information desired, enters a search term or search terms and a search engine returns a list of web pages that contain the term or terms. Alternately, a user may want to browse through data, as for example, when a user is not sure what information is wanted. Some search engines, such as YAHOO or LOOKSMART, provide categories of information and categories within those categories for selection by a user, who can thus drill down to an area of interest from a more general category.

The term "search engine" is frequently used to describe both crawler-based search engines and engines based on human-edited directories. Crawler-based search engines generally work by indexing web pages automatically and usually contain a spider, an index and search-engine software. A search engine "spider" crawls through the web, following links to other pages within the site, and returns its results to an index or catalog. The index will contain a copy of every web page visited by the spider. Search engine software analyzes each page in the index to find matches to a search and ranks the pages in order of relevance.

Each search engine builds its index and ranks the web pages in the index in its own way, which explains why a user is likely to receive different search results for the same search conducted on different search engines. Typically, search engines rank "hits" based on a search-engine-specific algorithm involving the location and frequency of keywords on a web page. For example, pages with the search term(s) appearing in the HTML (hypertext markup language) title tag are often assumed to be more relevant to the topic than others. A search engine also may check to see if the search keywords appear near the top of a web page. These search engines operate on the premise that any page relevant to the topic will contain the keywords within the title or within the first few paragraphs of the web page.

Frequency is another consideration in the determination of relevance. A search engine may analyze how often a keyword appears in relation to other words in a web page. Pages containing keywords appearing with a higher frequency are often deemed more relevant than other web pages.

The search engine returns a list of pages in order of relevance, as the search engine determines relevance. Unfortunately, this kind of search engine often returns irrelevant results because web pages frequently contain words that don't really relate to the query. For example, if a user enters the search query "Andalusian Horses", the search may return a web page concerning Vacations to the Andalusian Mountains in Spain.

The problem is compounded when a very general query term is entered or the query term is capable of multiple meanings, such as "Java" for example. Does the user want "Java" the programming language? "Java" as in "Where's my morning Java?" "Java" the island? A user looking for web sites concerning "Java" the programming language may have to page through a number of site listings about coffee and Java the island to find Java the programming language.

A second kind of search engine (e.g., YAHOO or LOOKSMART) matches terms in a query to a human-built directory of categorized web sites. A webmaster submits a short description of the site, or editors write a description for a site. When a user enters a search query, the search engine matches the terms in the query to the terms in the description and displays to the user only those web sites where a match is found between the word(s) in the query and the words in the description. Alternately, a human editor may review each site and manually assign the site to a particular category.

This type of search engine also has drawbacks. For example, in the case where a query is very broad, it may be hard to guess a category to attach the query to. Also, any web sites not editorially assigned to a category will be lost if the user picks the category. For example, imagine that a user enters the word "lincoln" as his query. Entering the word "lincoln" may result in the return of the following categories: "U.S. States>Nebraska", "Recreation>Automotive>Makes and Models" and "Arts>Performing Arts>Centers" (">" indicates that phrases to the right of the ">" are subcategories of phrases to the left of the ">"). But if a user picks the "U.S. States>Nebraska" category, only those sites the human editor has linked with that category will appear, even if there are other good sites that would appear if the user merely searched for the terms "Lincoln+Nebraska". If the user misspells the query terms or uses a different word than is contained in the description, relevant web sites may not appear at all.

A third type of search engine (e.g., YAHOO or Google) is a hybrid search engine that presents both crawler-based results and human-powered directory-based listings. Typically, a hybrid search engine will favor one type of listing over another. For example, YAHOO is more likely to present human-powered listings.

Search engines typically are unable to provide a hierarchical relationship between data entities. For example, a search for "Ford" typically returns dozens of different FORD model links, overwhelming different interpretations of the query (e.g., Harrison Ford). There is no way in typical search engines to indicate that "FORD Trucks" is a superset of "FORD F-150", "FORD Ranger", etc.

Finally, for the same topic, the search results returned from a browse and those returned from a search typically can be significantly different. In order to get the best search results, it is often necessary to have both a browse window and a search window open concurrently, which is inconvenient and requires a certain degree of sophistication and search-engine savvy on the part of the user. Unsophisticated users, unaware that a search engine may have multiple types of data sources, may become mystified and frustrated with the results of a search or browse. Hence, a need exists in the art for a method to process a search that enables each searcher to get great search results faster and more conveniently, regardless of how much the searcher knows about the eccentricities of the search engine used.

SUMMARY OF THE INVENTION

The present invention provides systems, methods and computer-readable media for combining the functionality of browsing based on categories and searching based on key word(s) for a refined query. Results may be returned from multiple data sources. When a user selects a concept from a list of multiple concepts returned from a primary search, both a browse and a search is performed on the node representing the selected concept. The following may be returned:

- any more refined category concepts linked to the selected concept (browse),
- sites linked to the selected context (browse)
- sites that are found by doing a full text search on nodes within the concept branch using a refined query string (search),
- sites found by doing a full text search on nodes external to the context branch using a refined query string (search), and
- sites found by doing a full text search on an external data source using a refined query, if necessary (search).

The browse functionality is conducted based on an underlying hierarchical data structure such as a directed graph (the web directory) composed of categorized and uncategorized nodes. Refining concepts (sub-categories of the selected concept) may be returned by finding child nodes of the node representing the selected concept. Alternatively, a broader browse can be performed by selecting parent nodes of the selected concept. Web sites associated with the selected concept and with the refining concepts may also be returned. An optimized full text search of the web directory and a second search database may also be conducted. Hence a combined set of results based on several data sources is returned, where the results returned are more nearly restricted to the user's area of interest without requiring the user to enter multiple queries.

The supporting hierarchical data structure includes nodes, where each node may include a data structure representing a concept associated with a category, a data structure representing a concept not associated with a category, or a category not associated with a concept. The concept data structure, as used herein, represents a concept and may include a concept title, a group of terms related to the concept (called herein key phrases), a core key phrase as well as other data attributes. A concept data structure also may include one or more optimized query strings, each tailored to a specific data provider.

A directed graph structure is created by editorially developing concepts and linking categories to the concepts, when appropriate. A new data set (the directed graph structure) that establishes hierarchical relationships between the data is created therefrom.

When refining a concept, the resulting sub-concepts and/or sub-categories may be displayed in decreasing order of popularity, where popularity is determined based on the average number of times a particular search term associated with the concept has been entered by searchers over the last several days.

The invention includes methods, systems and computer-readable media of varying scope. Other aspects and embodiments of the invention will become apparent by reading the detailed description and referring to the drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 7 is a diagram showing the results of matching the query log to the key phrases of a concept, in accordance with one embodiment of the invention;

DETAILED DESCRIPTION OF THE INVENTION

Overview

The present invention provides a mechanism that facilitates searching in a network-based environment. In such environments, users are typically searching for database, web sites, and other connected data sources that are relevant to their search term or terms. Searching in such an environment is based on the recognition that words and phrases generally are not concise terms but rather have myriad definitions that are context dependent. Moreover, the user may not know the precise term that will lead to the best information source. Rather, the user may know a term relevant to the search and rely on search feedback to zero in on the most relevant information.

Humans are adept at understanding the context of a word and inferring the accepted meaning from that context. Computer systems, on the other hand, are less adept at making such inferences. The present invention provides the mechanism for the human searcher to provide a computer-based system with additional contextual information so that the computer can help narrow the search results and provide a superior way for searchers to find the information most closely related to their search topic.

Exemplary Network Environment

Figure 1:
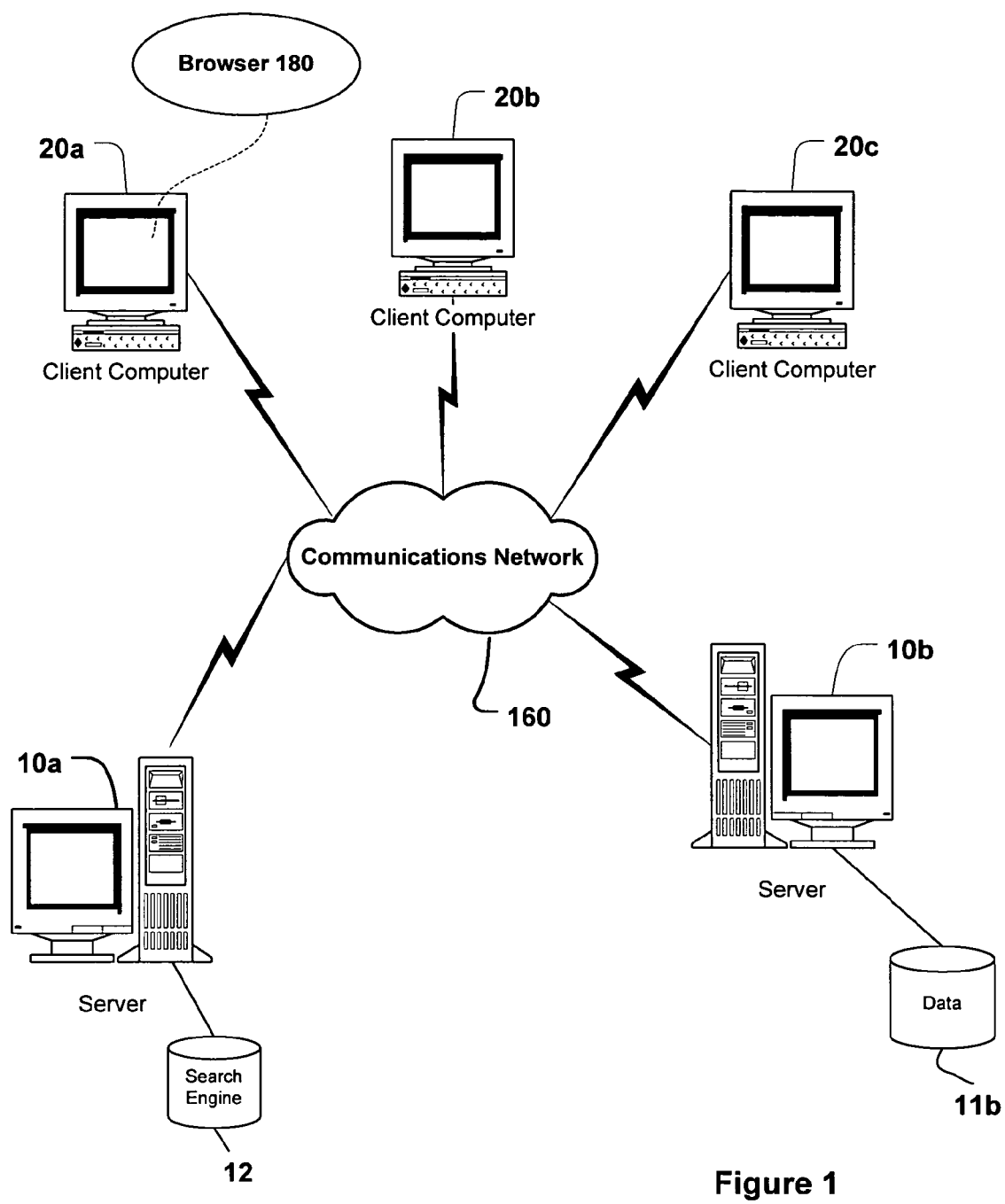
FIG. 1 is schematic diagram of an exemplary network environment in which aspects of the invention may be implemented.

As stated above, the invention operates as part of a computer network. In general, the computer network may comprise both server computers and client computers deployed in a network environment. FIG. 1 illustrates an exemplary network environment, with a server in communication with client computers via a network, in which the present invention may be employed. As shown in FIG. 1, servers 10a, 10b, etc. are interconnected via a communications network 160 (which may be a LAN, WAN, intranet or the Internet) with a number of client computers 20a, 20b, 20c, etc. In a network environment in which the communications network 160 is the Internet, for example, the servers 10a, 10b, etc. can be Web servers with which the clients 20 communicate via any of a number of known protocols such as hypertext transfer protocol (HTTP). Each client computer 20 can be equipped with a browser 180 to gain access to servers 10a, 10b, etc.

The present invention is preferably deployed in a network environment, particularly where that network is an Internet or Intranet environment. The term "Internet" is an abbreviation for "Internetwork," and refers commonly to the collection of networks and gateways that utilize the TCP/IP suite of protocols, which are well-known in the art of computer networking. TCP/IP is an acronym for "Transport Control Protocol/ Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

While the Internet is a global network of millions of computers where (with minor exceptions) anyone anywhere in the world can access any web site, an intranet is an internal web site, tucked behind a "firewall" which allows certain users access to a web site but denies others access to the web site. An intranet is a private version of the Internet available, typically, only to individuals internal to an organization or to a partnership of organizations. A firewall can comprise software, hardware or both. A firewall is essentially a filter between the inside and outside networks that only allows certain users to have access to the internal network from outside and only allows internal users access to certain outside network locations.

Electronic information transferred between data-processing networks is usually presented in hypertext, a metaphor for presenting information in a manner in which text, images, sounds, and actions become linked together in a complex non-sequential web of associations that permit the user to "browse" or "navigate" through related topics, regardless of the presented order of the topics. These links are often established by both the author of a hypertext document and by the user, depending on the intent of the hypertext document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the non-textual components of hypertext, such as animation, recorded sound, and video. Hypermedia is the integration of graphics, sound, video, or any combination thereof into a primarily associative system of information storage and retrieval. Hypermedia, as well as hypertext, especially in an interactive format where choices are controlled by the user, is structured around the idea of offering a working and learning environment that parallels human thinking— that is, an environment that allows the user to make associations between topics rather than move sequentially from one to the next, as in an alphabetic list. Hypermedia, as well, as hypertext topics, are thus linked in a manner that allows the user to jump from one subject to other related subjects during a search for information. Hyper-link information is contained within hypermedia and hypertext documents, which allow a user to move back to "original" or referring network sites by the mere "click" (i.e., with a mouse or other pointing device) of the hyper-linked topic.

A typical networked system that utilizes hypertext and hypermedia conventions follows a client/server architecture. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server).

A transmission of data, as in a software tracking application, can be sent by a client application program to a server. A server is typically a remote computer system accessible over a remote network such as the Internet. The server may transmit this data to another client application program. The client process may be active in a first computer system, and the server process may be active in a second computer system, communicating with one another over a communications medium, thus providing distributed functionality and allowing multiple clients to take advantage of the capabilities of the server.

Client and server communicate with one another utilizing the functionality provided by Hypertext-Transfer Protocol (HTTP). The World Wide Web (WWW) or, simply, the "Web," includes those servers adhering to this standard (i.e., HTTP) which are accessible to clients via a computer or data-processing system network address such as a Universal Resource Locator (URL). The network address can be referred to as a Universal Resource Locator address. For example, communication can be provided over a communications medium. In particular, the client and server may be coupled to one another via TCP/IP connections for high-capacity communication. Active within the client is a first process, known as a "browser," which establishes the connection with the server and presents information to the user. The server itself executes corresponding server software that presents information to the client in the form of HTTP responses.

The HTTP responses correspond to "web pages" constructed from a Hypertext Markup Language (HTML), or other server-generated data. Each web page can also be referred to simply as a "page."

The client typically displays the information provided through the network by the server, using a software application known as a browser. Most browsers have modern graphical user interfaces that are capable of displaying and manipulating various types of data. A graphical user interface is a type of display format that enables a user to choose commands, start programs, and see lists of files and other options by pointing to pictorial representations (icons) and lists of menu items on the screen. Choices can be activated generally either with a keyboard or a mouse. Internet services are typically accessed by specifying a unique network address (i.e., typically with a Universal Resource Locator). The Universal Resource Locator address has two basic components, the protocol to be used and the object pathname. For example, the Universal Resource Locator address, "http://www.uspto.gov" (i.e., home page for the U.S. Patent and Trademark Office), specifies a hypertext-transfer protocol ("http") and a pathname of the server ("www.uspto.gov"). The server name is associated with one or more equivalent TCP/IP address.

In order to locate information with the browser 180, the user typically employs one of the many available search engines that index, categorize, and otherwise organize access to various ones of the many web sites. Accordingly, the user would start off by connecting to a server such as server 10*a* having a search engine 12. Search engine 12 contains all of the algorithms and indexes to point the user to destination servers that have information relevant to the users search needs such as database 11*b* maintained by server 10*b*.

Implementation of the Web Directory

Figure 2:
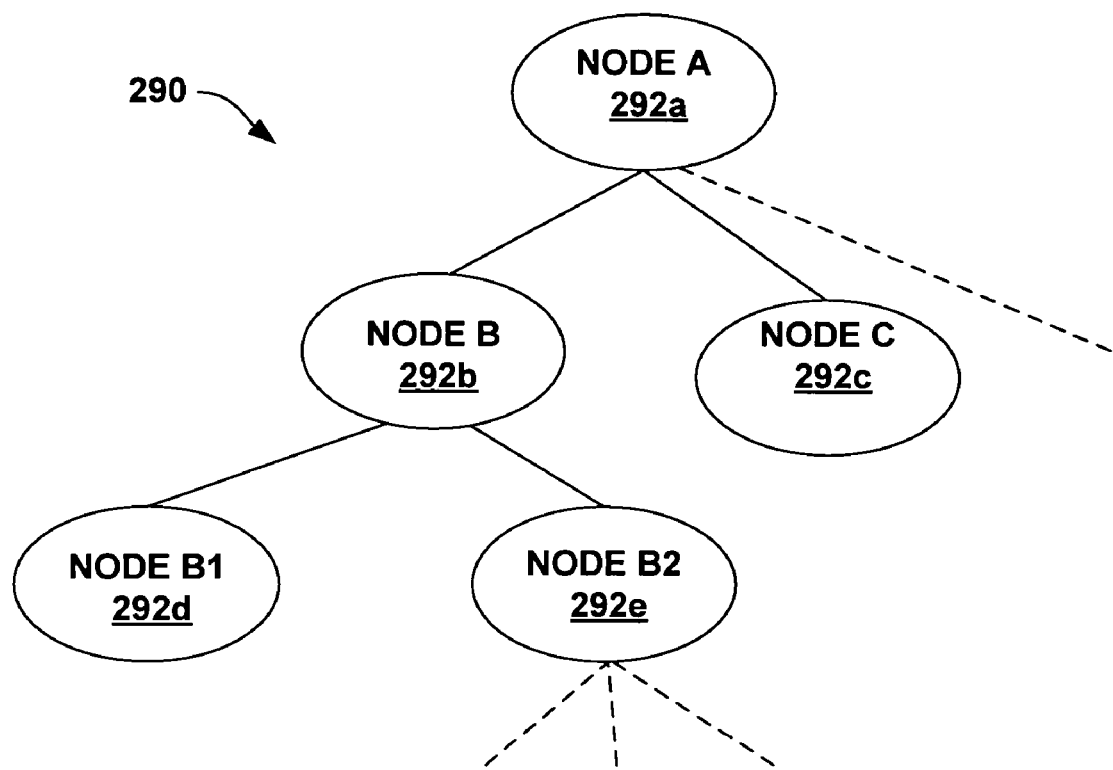
FIG. 2 illustrates a hierarchical data structure of the directory structure in accordance with an aspect of the invention.
Figure 2B:
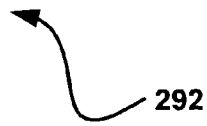
FIG. 2B illustrates an exemplary node structure in the hierarchical data structure of FIG. 2.

The search engine 12 provides an directory to help the user find relevant web sites and to navigate the web. Such a directory may take many forms. In accordance with the present invention, FIG. 2 illustrates a structure that is useful in organizing the search directory maintained by search engine 12 in accordance with the present invention. The directory is made up of a hierarchical structure of nodes (e.g., nodes 292*a-e*), preferably a tree structure or directed graph (e.g., tree structure 290). Each node 292 contains data relevant to a search topic of interest and is generally hierarchically organized from more general to more specific. For example, Node A 292*a* may contain information for searching on the topic of "Sports", while Node B 292*b* contains information for searching on the topic of "Golf", and Node 292*c* contains information for searching on the topic of "Golfers," and so on.

FIG. 2A is an illustration of an exemplary node 292 data structure. Each node has a Node ID# 202. This provides a mechanism to index the nodes in a database. Each node has a Title 204 and a Long Title 206 that are short and longer descriptions of the information captured by node 292. Description 208 allows nodes related to similar concepts to be differentiated. Approval setting 210 determines (as described below) how a node is used to return search results. Parent Node # 212 is a pointer to the parent of the current node 292. Similarly, child node # 214 contains pointers to child nodes of the current node 292. Popularity 216 determines how popular a particular concept is (described below). And override web directory/fall through directory 218 are manual settings to other directories. Category links 220 contains pointers to other category information.

Preferably, each node 292 eventually contains data of three different types: a concept data, a category data, or a concept data linked to category data. The three different nodes data structures are described below.

A concept data is derived from a data structure representing a search topic to which a group of key phrases synonymous with the search topic is associated, as well as data sites (such as web sites) at which information concerning the search topic may be found, and may include other data elements. These concept data structures are created manually by an editorial staff. An example of a group of key phrases) for the search topic "Tiger Woods" might include "Tiger", "Woods", "Tiger Woods", "Wood", "Tiger Wood" all of which are words that a user may enter as a query when searching for information about Tiger Woods.

A category is a group to which the search topic belongs. For example, for the category "Golfers", search topics belonging to the category might be "Tiger Woods" and "Arnold Palmer". Associated with the category may be data sites (such as web sites) at which information concerning both Tiger Woods and Arnold Palmer may be found.

A multi-source node is a concept that has been linked to a category. For example, the two data structures listed above may be combined to create a data structure which links the category "Golfers" to the concept "Tiger Woods", and links the concept "Tiger Woods" to the category "Golfer" so that a user who enters "Golfer" when really looking for information about "Tiger Woods" may be returned a list of golfers ("Tiger Woods", "Arnold Palmer"), allowing the user to select "Tiger Woods" so that information about Arnold Palmer is no longer displayed. Similarly a user who enters the search query "Tiger Woods" but is actually interested in a number of golfers or another golfer, can broaden the search results, by selecting a broaden option such as "Golfers" and have search topics "Arnold Palmer" and "Tiger Woods" displayed.

Figure 3:
FIG. 3 illustrates an exemplary concept data structure before merging into a node in accordance with an aspect of the invention.

FIG. 3 illustrates an example of how a concept data structure may be organized. Of course, various other organizations may be implemented that accomplish the same underlying purpose. A concept data structure 300, as described above is a group of related data elements including concept title 302, key phrases 304, core key phrase 306, web sites or other associated data entities 308 associated with key phrases 304, key phrase weights 310, disambiguator display title 312, ID# 314 and core key phrase requeries 316. Concept data structure 300 may include other data elements as well.

Concept title 302 represents one or more concept words that represent a concept to which key phrases 304 and core key phrase 306 may refer and may be a title of a concept that a user may wish to search for with a search engine. Concept title 302 may be manually determined.

Key phrases 304 for concept data structure 300 are phrases of one or more words that a user may enter as a search query to find information regarding concept title 302. Key phrases 304 may be alternative key words for concept title 302, misspellings of concept title 302, shorthand notation for concept title 302, or other phrases for concept title 302. Key phrases 304 are typically manually determined or edited, for example, by examining, query logs of past search queries to determine how users search for the concept represented by concept data structure 300.

Core key phrase 306 represents the key word or phrase that most users would enter in order to receive the results returned. Core key phrase 306 may represent the key phrase that represents the search query that will result in optimal search results when sent as a query to internal and external data sources.

Associated web sites 308 are web sites or other data entities that are returned to the user when the user searches for the concept represented by concept data structure 300. Although typically web sites 308 are links to web sites related to concept 302, web sites 308 may also be music file links, image file links, or other types of files or links. Associated web sites 308 are typically manually determined or edited as well.

ID# 314 is a numerical index by which the data structure can be retrieved from a database of data structures representing concepts.

Key Phrase Weights 310 are used in the determination of popularity (described more fully herein below).

Requeries 316a and 316b of requeries 316 are manually determined values that are used respectively instead of Core Key Phrase 306 as an optimized query term, when present. Requery web directory 316a is used as the optimized query term of the web directory and requery fall-through 316b is used as the optimized query term for searching a second database (such as one purchased from Inktomi). Requery web directory 316a and requery fall-through 316b may be the same or different.

Display Name 312 represents the way the concept will be indicated on a display.

Concept data structures 300 generally contain information grouped accordingly to a particular topic. Popular topics will often be given their own data structure to accelerate the user's search experience. For example Britney Spears is a popular singer and is a topic that is searched on so frequently that she may warrant her own data structure. In such as case, the concept data structure could be organized as described below.

The concept title 302 of the concept data structure 300 may be the words "Britney Spears". Key phrases 304 for the "Britney Spears" concept may be the word "Britney", "britney-spears.com", the title of Britney's albums, misspellings of Britney's name, such as "Brittney", "Brittany", and so on. Associated web sites 308 may include the official Britney Spears web site, as well as various fan sites, sites at which fans can purchase her music and others. Web sites 308 may also be edited. Web directory core key phrase 306 may be "Britney Spears", representing the way most people would search for information on the singer while fall-through core key phrase 306b may be "Britney". ID# 314 may be 123456, representing a numerical index into the web directory database for retrieving this concept. Key Phrase Weight 310 may be 0, −1 or −2 for the key phrase "Britney Spears" representing how closely the phrase is linked to the concept (Britney Spears).

Category data (as well as site data associated with the category), in a preferred embodiment, is imported daily from an external source, such as a search engine or other data source such as, but not restricted to, LOOKSMART. A database of potential categories is created from this data. A long category name imported from the external source may be placed in a category display name data element in the database so as to give context free description of the category. Alternately, a (shorter) title of the category may be placed in the display name data element. Data in the category database may be editorially modified.

The database created from the imported category data may be combined with a database of concepts to create or update the web directory structure 290 (FIG. 2) with nodes 292. A node 292 may be populated with one of a manually created concept, a category formed by importation of data from another search engine, or a multi-source node formed by merging a concept and a category. The nodes 292 are then linked into the directory structure 290.

In addition to the break down of nodes by concept, category, and multi-source, nodes are either approved or unapproved. Marking a node as approved or unapproved will affect how that node is used during a search.

Figure 4:
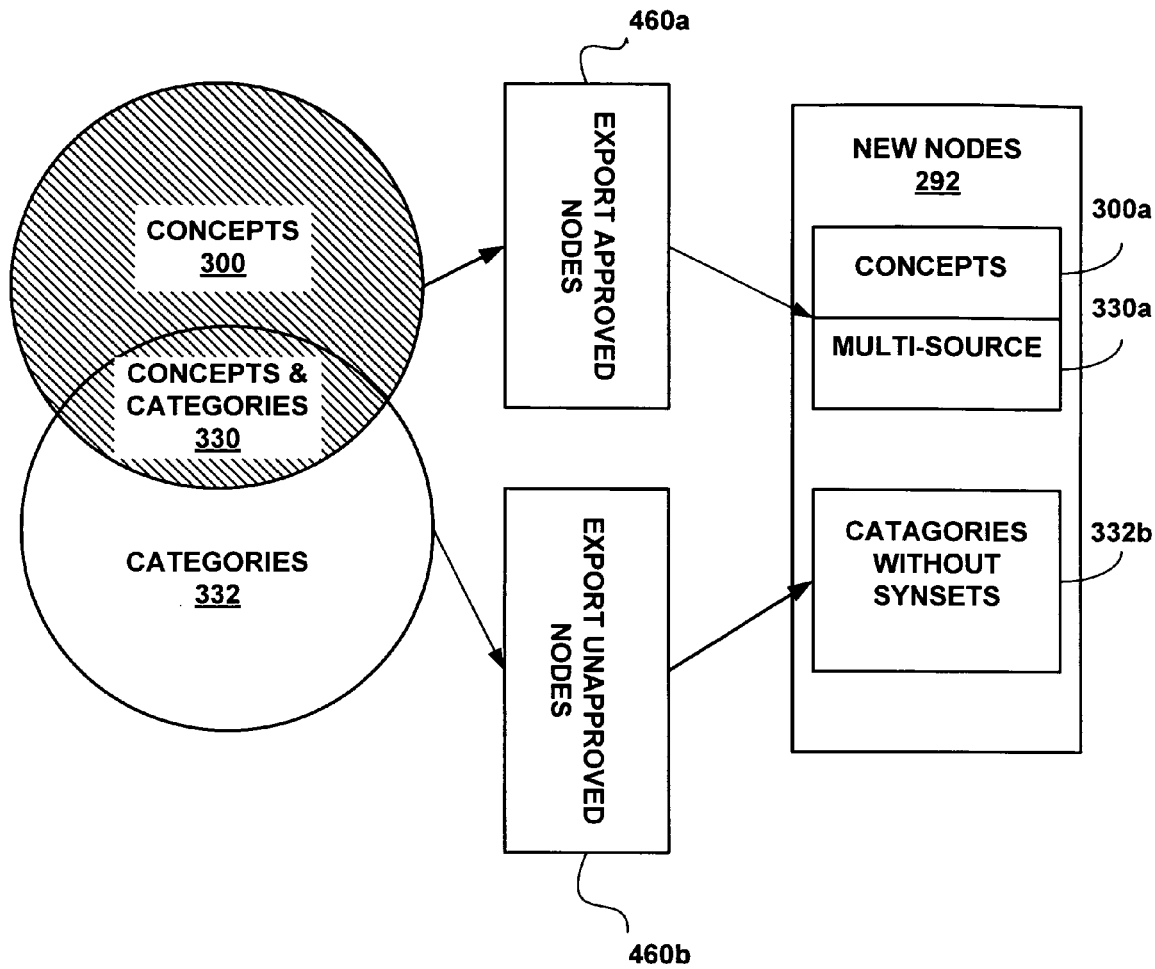
FIG. 4 is a diagrammatic illustration of the merging of categories and concepts into nodes in accordance with an aspect of the invention.

FIG. 4 illustrates at a high level how the various nodes 292 are formed, starting with concept data structures and categories. Concept only nodes 300a are exported into the directory as approved nodes by approval process 460a. Thereafter the node 292 may carry information indicating that it is approved. Alternatively, another mechanism such as a table could be used to keep track of a node's approval status. Some concepts are merged with categories forming multi-source node 330. These multi-source nodes are exported as approved multi-source nodes 330a. Category only nodes 332 are exported as unapproved nodes 332a by process 460b. These nodes 292, are all merged into a directory structure 290 that contains both approved and unapproved nodes.

Figure 5:
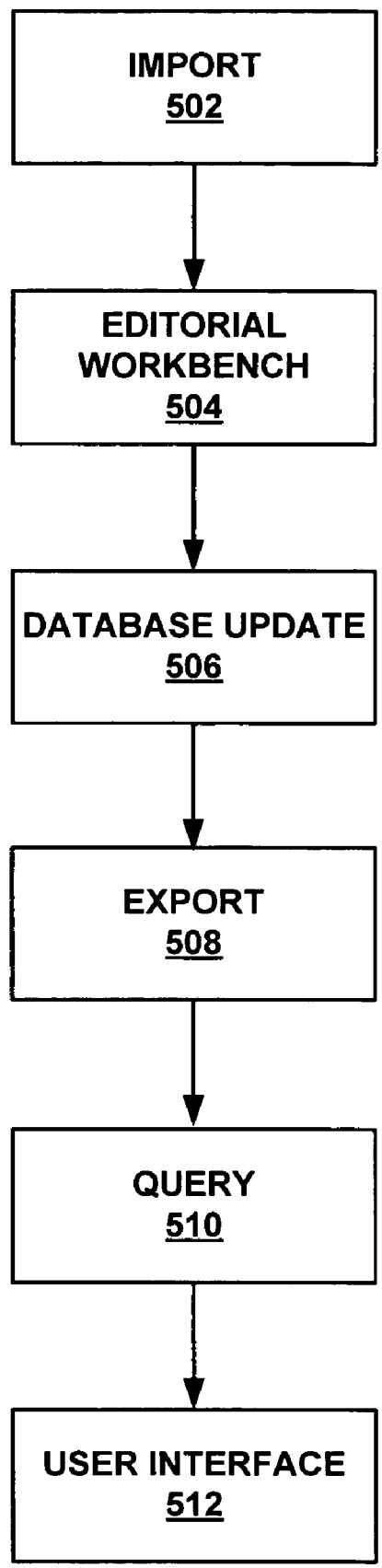
FIG. 5 is a flow diagram of a process in which nodes in the directory structure of FIG. 2 are populated with data.

FIG. 5 further illustrates the process of FIG. 4 that creates the underlying data structures and conducts a search/browse in accordance with the present invention. At step 502 (Import) data is imported from an external source (e.g., LOOKSMART). At step 504 (Editorial Workbench) human editors review and revise the data imported at step 502, and create links between datasets (i.e., sets 300, 330, and 332). At step 506 (Database Update) a database is updated with edited data from steps 502 and 504. A popularity calculation (described below) is indexed, and added to the data image, or database, which may be used by a search engine to answer queries entered by users. At step 508 (Export) a new directory structure 290 is created by combining the revised datasets of step 506. Thereafter the directory structure is available for users to search. Accordingly, at step 510 (Query) a user refines a query and at step 512 (User Interface) query results are returned to the user as described below.

Creating Associations Between Concepts and Categories to Produce Approved Nodes

During editing (504) if a concept exists for which there is no corresponding category, no link is created between the concept and a category. If a concept exists and one clearly corresponding category relating to the concept exists, a link is created between concept and category, resulting in the production of an approved node in step 508. In a preferred embodiment, if an existing concept relates to a plurality of categories, a plurality of nodes are created, with concept sites listed first in associated web sites 306 (see FIG. 3) followed by category specific sites. Alternately, category sites are listed first and then concept sites. The node preferably uses category name as a concept title 302 so that nodes with duplicate names are not created. If multiple concepts relate to one category, all the concepts are linked to the one category. Multiple nodes are created, in which each node lists the concept sites first and then lists the category-specific sites. If there is one category and no related concept, the node produced is an unapproved node. The unapproved node will not be returned as a sub-category during a search. If there is one category and no related concept but the category is a desired category, a concept may be editorially created, resulting in the production of an approved node in step 508.

The following describes one method for combining node attributes (i.e., linking categories and concepts) at step 504:

1. The Node ID is set to concept data structure ID.
2. The Name or Title is set as follows:
   If there is only one category associated with only one concept, one node is created with node ID set to the node ID of the category. The title of the node is set to the category title and the node is indexed by title.
   If there is only one category associated with a plurality of concepts, one node is created. The title is set to category title and the node is indexed by title. One node is also created for each concept with Display Name used as the title or name for each node and each node is indexed by title.

If there is only one concept associated with a plurality of categories, one node is created for each category with the title of the node being the title of the category.

If there is a concept with no sites associated therewith, no node is created.

If a concept is associated with only one site, one node is created with the title of the node being the Display Name. The node is indexed by title.

If a concept is associated with a plurality of sites, one node is created with title set to Display name.

3. The Long Title is set as follows
If there is only one category associated with only one concept, the long title of the node is set to Display Name. The node is not indexed by long title because the node is indexed by Description, which is also set to Display Name.

If there is only one category associated with a plurality n of concepts, n nodes are created. The title is set to Display Name for each of the n nodes, and long title is not indexed.

If one concept is associated with a plurality of categories, one node for each category is created with Category Internal Name for each category being used for long title. The node is indexed by long title.

If there is a concept with only one site associated, one node is created with Display Name used for long title. The node is not indexed by long title.

If there is a concept associated with a plurality of sites, one node is created with long title set to Display name. The node is not indexed by Display Name.

4. The Node Description is set as follows:
If only one category is associated with only one concept, one node is created with the Display Name being used for the description of the node and the node is indexed by Display Name.

If only one category is associated with a plurality of concepts, one node is created for each concept with Display Name as description, and each node is indexed by description.

If there is a concept with only one site attached, one node is created with Display Name as the description of the node. The node is indexed by description.

If there is a concept associated with a plurality of sites, one node is created with description set to concept display name. The node is indexed by Display Name.

5. The Node Approval Setting is set to Approved
6. Keyphrases is set to point to an appropriate keyphrase grouping.
7. The Parent Node ID is set to the node identification number of a category to which a node belongs (its parent). If a concept is not linked to a category, then the node has no parent.
8. Fall-through query is manually determined editorially in step 504.
9. Web directory query is manually determined editorially in step 504.
10. The Popularity Rating is set as described below with respect to FIG. 6.

Unapproved nodes are created according to rules such as:
1. Node ID is set to a dummy identification code.
2. Title is determined as follows:
If there is only one category and the category has no concepts linked to it, category title is used for the title. The node is indexed by title.

3. Long Title is determined as follows:
If there is only one category with no concepts associated with the category, category internal name is used for the long title. The node is indexed by long title.
3. The node Description is blank.
4. The node approval is set to Unapproved.
5. The Parent Node ID is set to the Node ID of parent category. If there are a plurality of parent categories, one is chosen at random.
6. The Popularity Rating is determined in accordance with FIG. 6.

In one embodiment, concepts are only exported if the concept has exportable status, the concept has at least one site attached and the concept was not auto-created (i.e., lower quality). If the concept has no key phrases and is associated with a category, the node is exported as an unapproved node.

Popularity Calculation

Query logs are imported daily in an automated process from an external source, such as LOOKSMART. Query logs for a configurable number of days, (e.g. 3) are stored in a database of query logs. Query logs are used to compute the popularity of a concept key phrase as described below.

Query logs containing the query terms (key phrases) entered by users of a search engine during the previous day are imported and stored in a database. In a preferred embodiment, query logs are imported daily and an alert is generated if the import fails. Query logs are stored in the database for a configurable number of days, which in a preferred embodiment are the previous three days. In an alternate embodiment, only the top N queries are imported, where N is a configurable number of queries.

If an imported key phrase already exists in the key phrase database, the query count for that key phrase is updated. If an imported key phrase does not exist in the key phrase database, the phrase is added to the key phrase database with an indicator (such as type="Created by Keyphraser") to distinguish these key phrases from key phrases that are created by human editors.

Periodically a garbage collector runs to remove key phrases created by the import that are not associated with a concept and have not had query count information updated in a configurable period of time. The garbage collector process serves to remove key phrases, which experience a brief and transient period of popularity.

Figure 6:
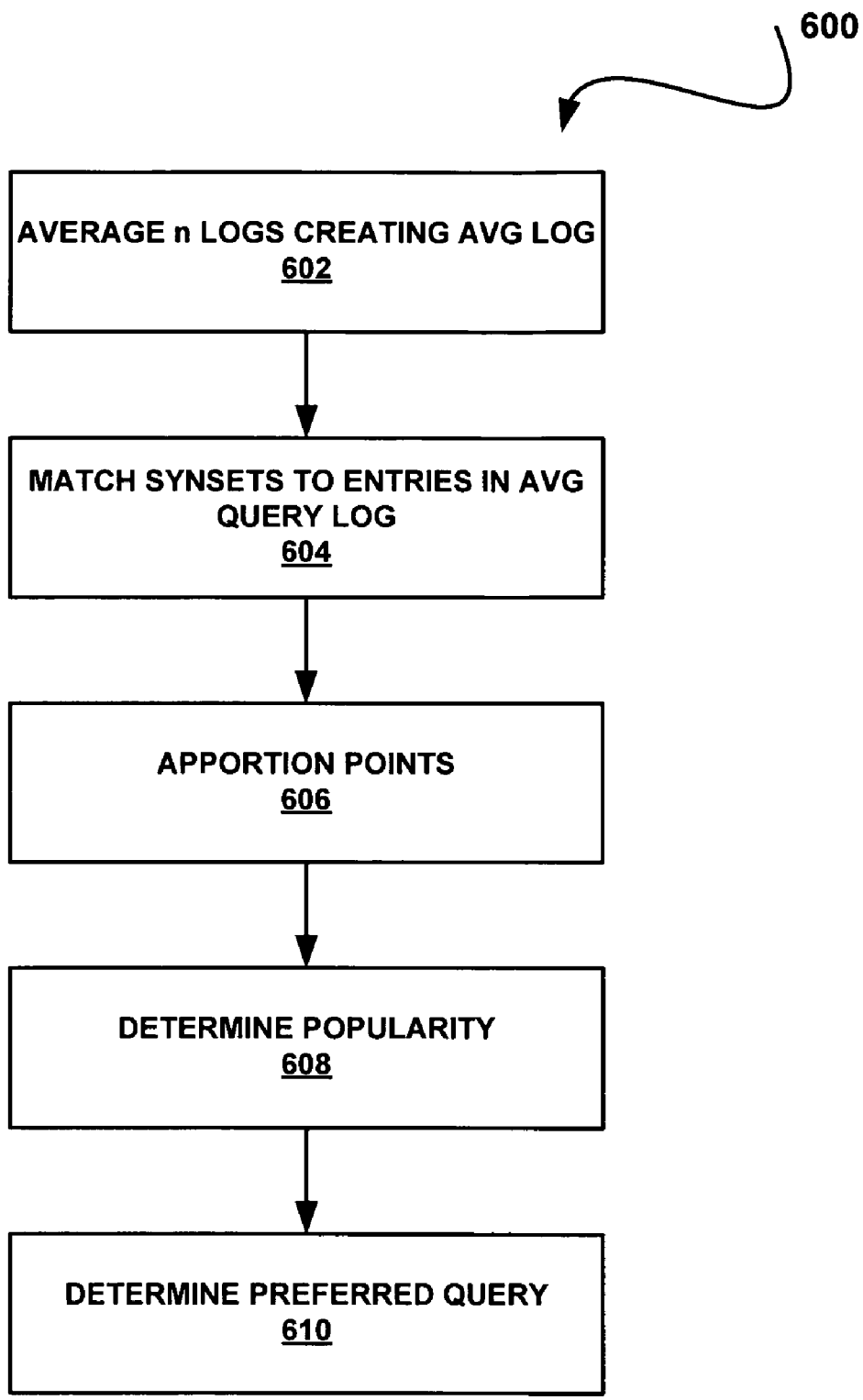
FIG. 6 is a flow diagram illustrating a method of calculating popularity, in accordance with one aspect of the invention.

FIG. 6 is a flowchart illustrating a method of calculating popularity (600). A query log is imported. A query log includes a number of queries, where each query is a query phrase including one or more words. A query may appear more than once in the query log. Alternatively, each query in a query log may be a unique query, and have associated with it the number of times the query was entered during the logging period. For example, in the former case, if the query "golf balls" was entered 700 times during the logging period, it would appear 700 times in the query log. In the latter case, however, the "golf balls" query would appear once, along with the number 700 to indicate that "golf balls" was entered as a query 700 times during the logging period.

The term "query log" is used generally. A query log may be a historical log of queries that have been entered by users during a logging period, and this is how it is predominantly used. However, a query log may also be modified to actively affect the popularity of concepts. For example, a query log may be populated with queries that were not actually entered so that the popularity of concepts are predictively modeled. For example, if it is known that "Super Bowl" will be a popular search query in the coming months, the query log may be modified to add this query a large number of times to the log. Other ways to affect the ensuing popularity of concepts, for other predictive modeling, or for demographic or for other reasons, are also encompassed within the term query log.

At step 602 the number of times each query term is entered for each of the previous N days is calculated and averaged, producing an averaged query log which is used to calculate popularity in the following steps. In a preferred embodiment, N=3, but N could be any suitable number. N may be a configurable value.

At step 604 one popularity point is added to a concept each time the (averaged) query log query phrase matches a key phrase unique to the concept or contained in concept 302. For example, the query "Brittany" may appear 350 times in the query log. For the concept "Britney Spears", there may be a key phrase "Brittany" that is unique to the "Britney Spears" concept. In this case, 350 popularity points are added to the concept "Britney Spears". As another example, the query "Britney Spears" may appear 200 times in the query log. Because "Britney Spears" matches the concept title "Britney Spears", 200 popularity points are added to the concept.

At step 606, for query phrases in the query log that match key phrases of more than one concept, a number of popularity points equal to the number of times such a query phrase appears in the query log is divided among the concepts. For example, the query "tiger" may appear 400 times in the query log. There may be two concepts that include the key phrase "tiger", the concept "Tiger Woods", and the concept "tiger". In this case, the 400 popularity points for the query "tiger" may be apportioned between the two concepts. One way to apportion the popularity points is to proportionally divide the points among the concepts based on their amassed popularity points resulting from step 604. For example, the concept "Tiger Woods" may have 900 popularity points so far, and the concept "tiger" may have 100 popularity points so far. Therefore, 90% of the 400 popularity points for the query tiger are added to the concept "Tiger Woods", and 10% are added to the concept "tiger". Other ways to apportion the popularity points can also be used, however, such as equally dividing the points among the concepts that have such matching key phrases.

Each concept has a number of popularity points added thereto, based on the matching of query phrases to the key phrases of the concept. This is shown in FIG. 7. The concept 300 has a number of popularity points, 6023. Each key phrase 304a, 304b, . . . 304b contributes a number of popularity points 702a, 702b, . . . 702n, respectively, to the number of popularity points 702 of the concept itself. Adding the popularity points 702a, 702b, . . . 702n together yields the number of popularity points 702 of the concept 300 itself.

Referring back to FIG. 6, two other parts of the popularity calculation 600 may be optionally performed. At step 608, a relative popularity measure of each concept may be determined. Relative popularity measure reflects the popularity of each concept as compared to the other concepts, as the concepts appear in the averaged query log by concept title 302 and key phrases 304. Relative popularity may be calculated in many different ways. For example, relative popularity may be measured on a scale from zero to five, where zero means the concept is least popular, and five means the concept is most popular. In such a case, the popularity measure of a concept can be determined in this implementation as five times the log of the popularity points attributed to the concept divided by the log of the popularity points attributed to the most popular concept.

The calculated popularity is stored in a calculated popularity field of the synset. Calculated popularity can be overridden editorially by entering a value for a concept popularity override field, so that if a value is present in the concept popularity override field, that value is used during export but if no value for concept popularity override field exists, calculated popularity is used for export.

Creation of Optimized Query Datasets

Results returned from entering different search queries for the same search concept are compared and the best term to use is determined. The term that results in the best search results is entered as "core key phrase". The entry in the Core key phrase attribute may be used when a user selects a popular search topic for refinement or to broaden the search. Core key phrase may be used for searching the web directory or the external data source if no value exists in web directory optimized query 316a or fall-through optimized query 316b, respectively. Optimized query strings 316 can be updated editorially to override the value stored in the core key phrase attribute. If an override string is present, the override field is used for export. If no override string is defined, refined query strings for Web Directory and fall-through search engine defaults to core key phrase. If no core key phrase is defined, refined query strings default to the concept title.

Configuration of Nodes to be Used for Search and Browse

The nodes that are used for searching and browsing in accordance with an aspect of the invention described below are configurable by setting a node's use as follows:
1. approved nodes are used for browse.
2. approved nodes are used for search.
3. approved nodes are used for search and browse.
4. unapproved nodes are used for browse.
5. unapproved nodes are used for search.
6. unapproved nodes are used for search and browse.
7. approved and unapproved nodes are used for browse.
8. approved and unapproved nodes are used for search.
9. approved nodes and unapproved nodes are used for search and browse.

Preferably, the default used is option three (3), approved nodes only, for the United States and option six (6), unapproved nodes, for International markets.

Figure 8:
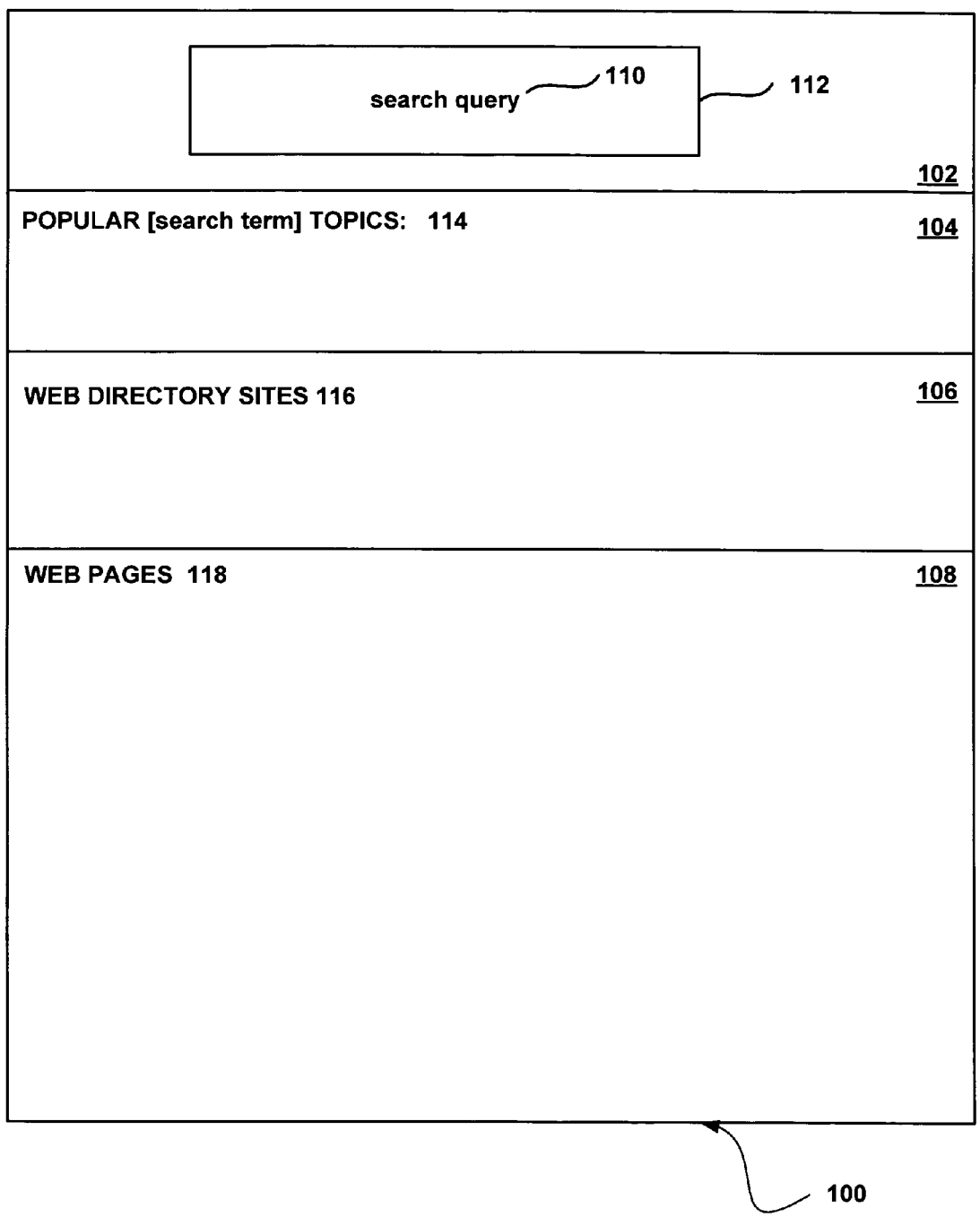
FIG. 8 is a block diagram illustrating a window that may be used to return search results to a user who has entered a search query as is known in the art.

FIG. 8 illustrates an example of how a search window for searching for network-based data may be organized to return search results to a user who has entered a primary search query. Search window 100 may generated by server 10a and displayed, for example, by browser 180 on client computer 20a (refer back to FIG. 1). The particular organization of search window 100 may be arranged in a variety of ways such as user preferences, usability, and so. In this example, a search query 110 that may comprise one or more search terms is displayed in query box 112 of section 102 of search window 100. In section 104 a section title 114 such as "POPULAR [search term] TOPICS" is displayed, where "[search term]" is replaced by the user's query. As described below, section 104 will be populated by concepts 302 from nodes 292 that have associated key phrases that match search query 110. A web directory site section 106 may also be included in window 100 that may have a section title 116 such as "WEB DIRECTORY SITES." As described below, this section contains links to associated web sites 308 from nodes 292 that have a key phrase 304 that matches the search query 110. Links to other relevant web pages may be displayed in web pages section 108 that includes title 118 such as "WEB PAGES". Web pages come from a full text search of the Inktomi database using override fall-through and if there is no override fall-through then core key phrase. If no core key phrase then concept title.

Figure 8A:
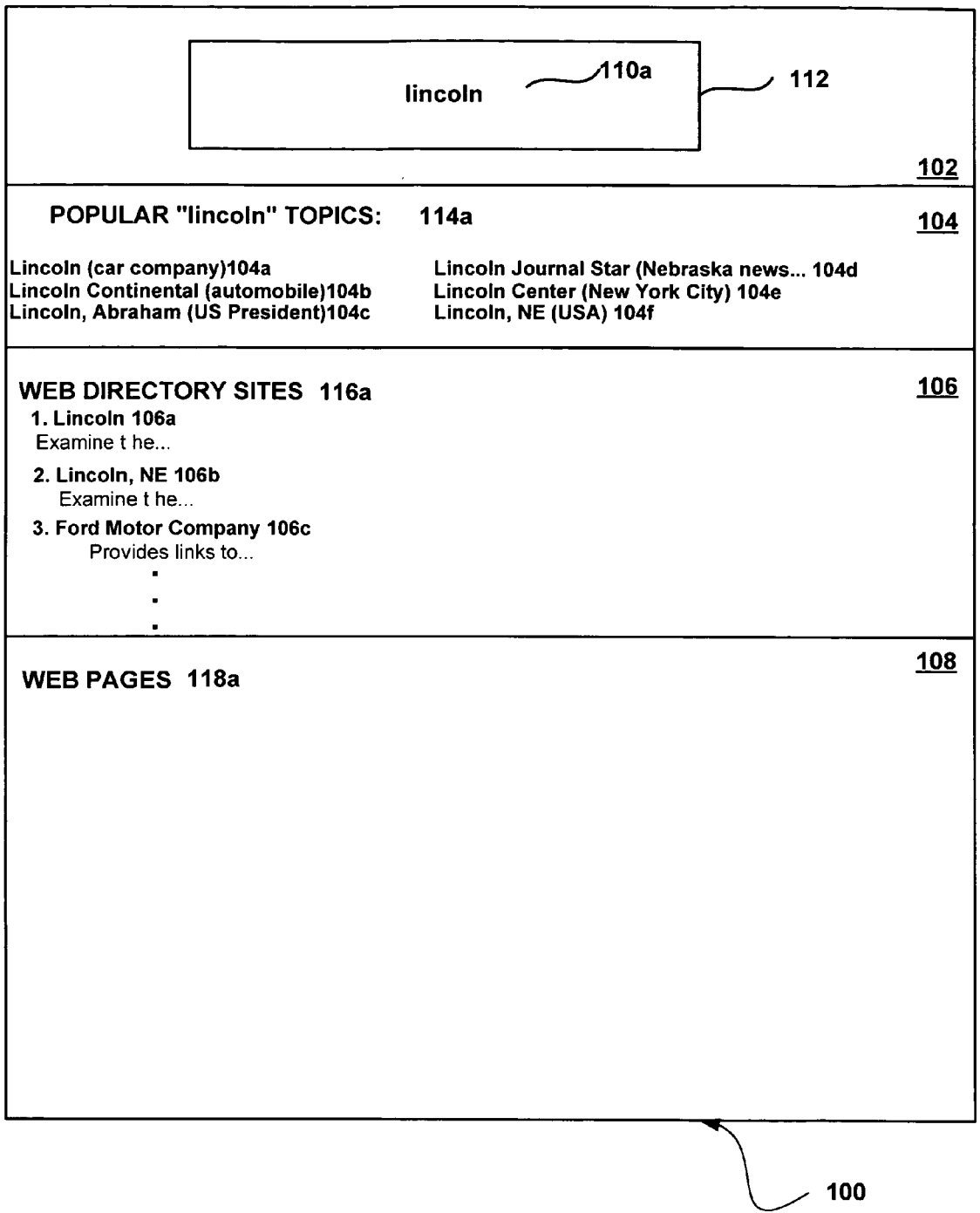
FIG. 8A is a block diagram of FIG. 1 containing exemplary data for purposes of illustration.

FIG. 8A illustrates by way of example how window 100 would be populated after a searcher has entered a query term. Here, the searcher has entered query term 100*a* "lincoln". As a result, the search term 100*a* was sent to server 10*a* where the term is compared to keyphrases 306 for each node 292 in the hierarchical structure of nodes 290. In this example, six nodes 292 contained the keyphrases 306 "lincoln". These nodes 292 are displayed by way of their title 302 and are displayed in accordance their popularity rating. When displayed in the display window, they are referred to as associated concepts 104. In this example, associated concepts 104 are displayed such as the associated concepts 104*a-f*: "Lincoln (car company)" 104*a*, "Lincoln Continental (automobile)" 104*b*, "Lincoln, Abraham (U.S. President)" 104*c*, "Lincoln Journal Star (Nebraska news . . . " 104*d*, "Lincoln Center (New York City)" 104*e* and "Lincoln, Nebr. (USA)" 104*f*. The associated concepts returned in section 104 are referred to herein as "popular search topics" (PSTs) and are displayed in order of decreasing popularity. That is, in the above example, "Lincoln (car company)" 104*a* is a more popular search topic than "Lincoln Continental (automobile)" 104*b* which is more popular than "Lincoln, Abraham (U.S. President)" 104*c* and so on.

Search/Browse

After returning the search window 8A above, the user is presented with a number of PSTs. Notably, the only commonality among the PSTs is that they all match the initial search query, e.g., search query "lincoln" 110*a*. However, it is unlikely that a user is interested in "Lincoln (car company)" and "Lincoln, Nebr. (USA)." Rather, the user is most likely interested in some information related to one or the other but not both. Additionally, the information returned maybe from any number of unrelated nodes retrieved from the hierarchical data structure on the basis of a match. No information is provided about surrounding nodes to provide a context for the user. The present invention provides systems and methods to address this issue in the form of a search/browse.

Figure 9:
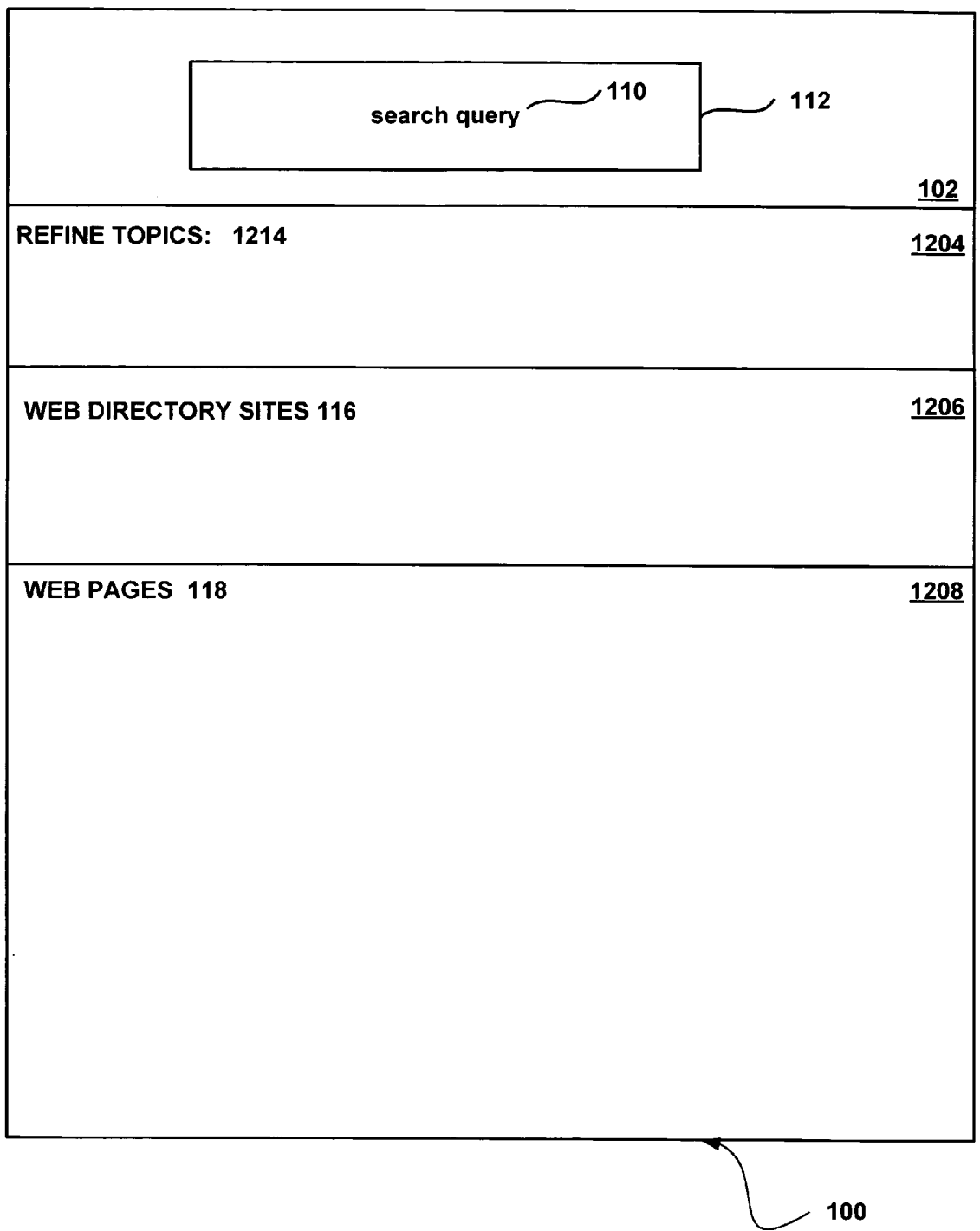
FIG. 9 is a block diagram illustrating a window that may be used to return search results to a user who has refined a search query in accordance with an embodiment of the invention.

If a searcher (i.e. user) selects one of the concepts, e.g., 104*a-f*, displayed in section 104 of FIG. 8A, the server, e.g., 10*a* retrieves information from a portion of the hierarchical data structure 290 around the selected node 292 and returns this information for display in an updated window, such as the window illustrated in FIG. 9.

The updated window illustrated in FIG. 9 may include the following sections: query section 102 including query box 112 for search query 110, refine topics section 1204, web directory sites section 1206 and web pages section 1208. Refine topics section 1204 may include a title 1214, such as "REFINE TOPICS:" which may be followed by sub-categories of the selected PST. Web directory sites section 1206 may include a title 116, such as "WEB DIRECTORY SITES" and may be followed by web sites associated with the selected PST and sub-categories of the selected PST. Web pages section 1208 may include title 118, such as "WEB PAGES" which may be followed by web pages returned when a full text search is conducted on a database from an external source.

Figure 10:
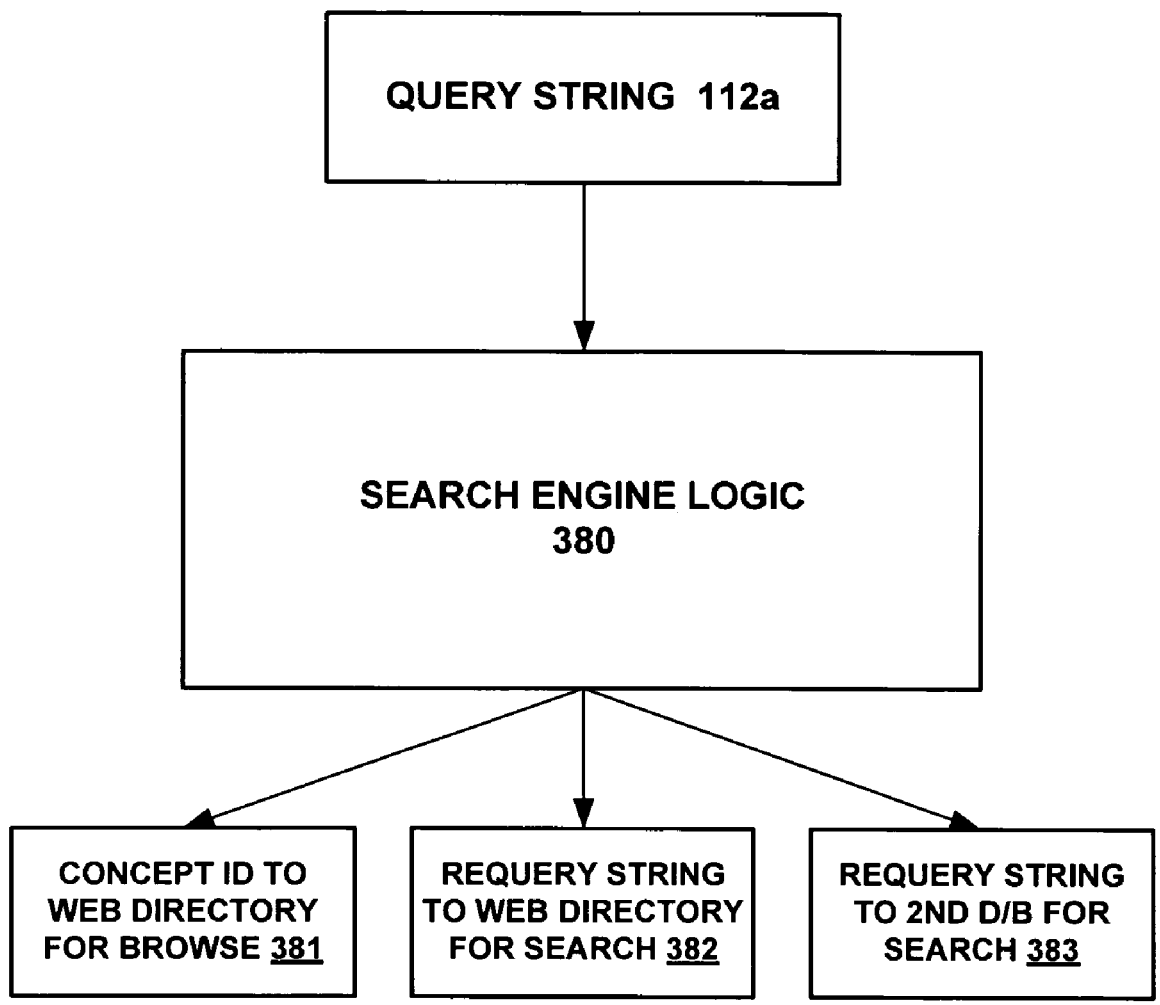
FIG. 10 is a block diagram illustrating the flow of data during a search/browse.

When a user selects a PST (called refining a search), both a search and a browse may be conducted to return the results. The search query term 110 may be replaced by a more specific query phrase associated with the PST selected, as illustrated in FIG. 10, which shows the flow of query string data in a search/browse. For example, a browse (381) on a node associated with the PST selected in a first database (a web directory) may be performed using a node ID# 202 and any sub-categories available for the selected PST may be retrieved and displayed in section 1204. In section 1206 directory web sites associated with the selected PST may be displayed. These sites may be followed by sites associated with the sub-categories of the selected PST, retrieved by doing a search on the web directory using a query string 382 that has been optimized for the web directory so that better results may be obtained. Finally web pages returned from a full text search of a second database on a query phrase 383 associated with the selected PST and selected to optimize results, may be displayed in web pages section 1208.

Figure 9A:
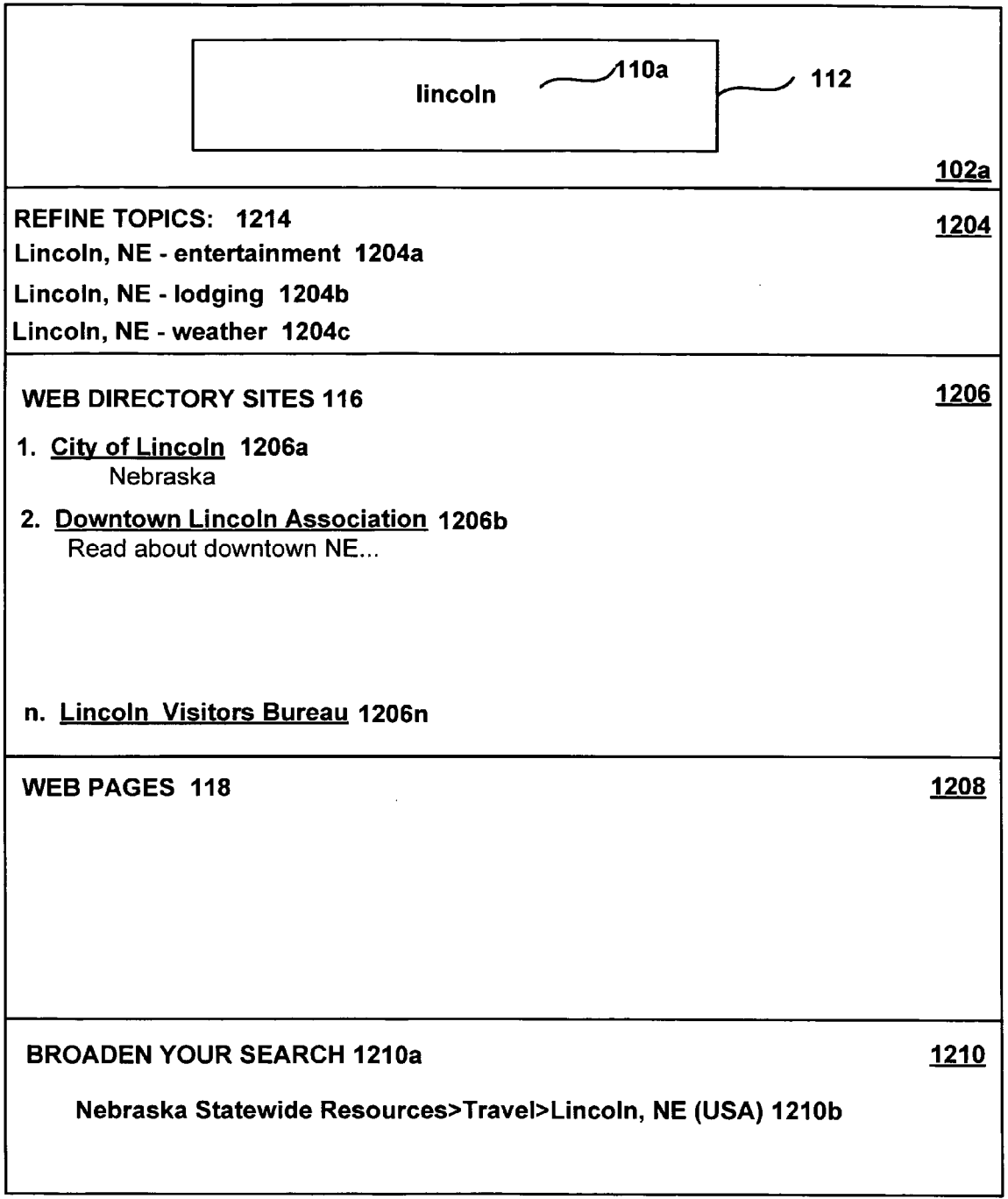
FIG. 9A is the block diagram of FIG. 9 containing exemplary data for purposes of illustration.

Assume, for example, that a searcher has selected concept 104*f* "Lincoln, Nebr. (USA)" in FIG. 8A. Search query term 110*a*, (e.g. "lincoln"), may be replaced by a more specific query phrase, (e.g., "'lincoln'>Lincoln, Nebr. (USA)"), associated with selected PST 104*f* and may be displayed in section 1204. It should be noted that the more specific query phrase may show the pathway followed to get to the present level of refinement. In FIG. 9A, the entries displayed in section 1204 (e.g. "Lincoln, Nebr.—entertainment" 1204*a*, "Lincoln, Nebr.—lodging" 1204*b*, "Lincoln, Nebr.—weather" 1204*c*) are sub-categories of the PST "Lincoln, Nebr." 104*f* selected by the user in the first window illustrated in FIG. 8A. Sub-categories may be displayed in order of popularity, as described above.

In web directory section 1206 sites for the node associated with selected PST 104*f* are returned: ("City of Lincoln" 1206*a*, "Downtown Lincoln Association" 1206*b* and so on, followed by sites associated with the subcategories "Lincoln, Nebr.—entertainment" 1204*a*, "Lincoln, Nebr.—lodging" 1204*b*, "Lincoln, Nebr.—weather" 1204*c*, such as "Lincoln Visitors Bureau—entertainment, lodging . . . " 1204*n*. Sites associated with descendents of the PST 1204*a-c* may also be shown. Thus, web sites 1206*a* . . . *n* are web sites that relate to the concept selected by the user in the window illustrated in FIG. 8A. Web page section 1208 may list web pages returned by a full text search of the words in the optimized search query 104*f* fall-through string and thus are web pages relating to the concept selected by the user.

Sub-categories (also called "REFINE TOPICS"), if any, of the PST selected by the user are displayed by performing a lookup (browse) in a directed graph structure of nodes using a category ID obtained from the selected PST to find sites associated with the PST and child nodes of the node representing the PST. The type of nodes used can be specified for each market (e.g., United States, Canada, Great Britain) by the use of a configurable parameter, described more fully below.

In one embodiment, if the specified type of node is found, a display name for the child node or nodes is displayed. A user may then click on the display name to further refine results.

Any number of sub-categories may be returned. In one embodiment, section 1204 will be displayed if a minimum of two sub-categories are found for the search query. If more than six sub-categories are found for the selected PST, sub-categories one to three (e.g., 204*a-c*) may be displayed in the first column and sub-categories four to six (not shown) may be displayed in the second column. If the sub-category name is too long to fit in the column, the name may be truncated and terminated by ". . . ". Any remaining sub-categories may be displayed by clicking on a message and link that states "Show All Refine Topics . . . " (not shown). Remaining sub-categories may then be displayed in section 1204*a*.

In one embodiment if there are fewer than five sub-categories, one column of sub-categories may be displayed. If there are five matching sub-categories, two columns may be displayed where column one includes sub-categories 1204*a-c* and column two includes matches 1204*d* and 1204*e* (not shown).

In section 1206, web sites for the current nodes may be displayed by browsing the node and displaying web sites associated with the node. Remaining sites for the node descendents may be displayed by doing a restricted search using a web directory optimized query string. If fewer than a configurable number, (e.g., 15), results are returned, a full text search on a second database (such as one purchased from Inktomi) is performed using a fall-through optimized query string. If no optimized query string exists, the sites attached directly to the node are displayed.

Alternately, a user may determine that the topic of interest has been narrowed too much and may wish to broaden the area of the user's search, "drilling up" instead of "drilling down". For example, in FIG. 9A in section 1210 may display a message such as "Broaden Your Search" 1210*a* followed by a display listing choices such as "Nebraska Statewide Resources>Travel" for "Lincoln, Nebr. (USA)" 1210*b*. Selection of "Travel" may result in the display of a list of directory websites such as "Genuine Nebraska: search for attractions, lodgings and events in specific county or region tourism offices" and "TravelNow Nebraska: search by area or by city to find a list of local accommodations . . . ." Hence, the topic of "Travel" is broadened from Lincoln, Nebr. to the state of Nebraska.

To display the broadening topics of the categories in the PST area, non-duplicate parents of the categories matched in the PST area are displayed. In one embodiment, only parents that have at least three children in the result set will be selected for display. In one embodiment display of parents will be in order of the number of children of the parents so that those parents with more children are displayed before those parents with fewer children. It should be appreciated that the broaden feature described above may be available from a primary search as well as a refined search screen.

Illustrative Computing Environment

Figure 11:
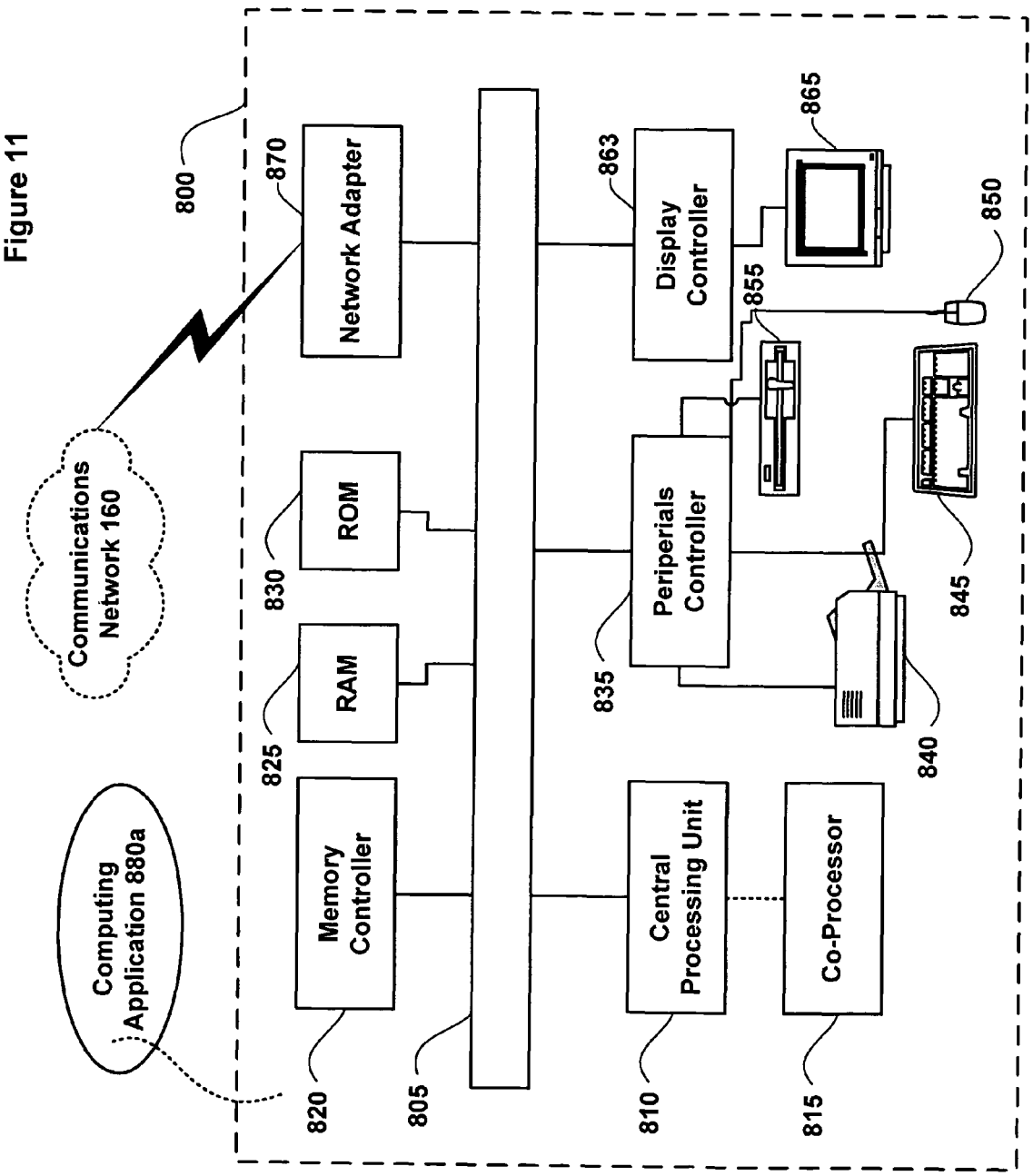
FIG. 11 is a schematic diagram of an exemplary computing environment such as may be used in the implementation of the present invention.

The system described herein may be implemented in a number of computing environments. FIG. 11 depicts an exemplary computing system 800 in accordance with the invention. Computing system 800 is capable of executing a search and a browse on a single query in accordance with the invention. Exemplary computing system 800 is controlled primarily by computer readable instructions, which may be in the form of software, wherever, or by whatever means such software is stored, such as on computer-readable media. Such software may be executed within central processing unit (CPU) 810 to cause data processing system 800 to do work. In many known workstations and personal computers central processing unit 810 is implemented by a single-chip CPU called a microprocessor. Coprocessor 815 is an optional processor, distinct from main CPU 810, that performs additional functions or assists CPU 810. One common type of coprocessor is the floating-point coprocessor, also called a numeric or math coprocessor, which is designed to perform numeric calculations faster and better than general-purpose CPU 810. Recently, however, the functions of many coprocessors have been incorporated into more powerful single-chip microprocessors.

In operation, CPU 810 fetches, decodes, and executes instructions, and transfers information to and from other resources via the computer's main data-transfer path, system bus 805. Such a system bus connects the components in computing system 800 and defines the medium for data exchange. System bus 805 typically includes data lines for sending data, address lines for sending addresses, and control lines for sending interrupts and for operating the system bus. An example of such a system bus is the PCI (Peripheral Component Interconnect) bus. Some of today's advanced busses provide a function called bus arbitration that regulates access to the bus by extension cards, controllers, and CPU 810. Devices that attach to these busses and arbitrate to take over the bus are called bus masters. Bus master support also allows multiprocessor configurations of the busses to be created by the addition of bus master adapters containing a processor and its support chips.

Memory devices coupled to system bus 805 include random access memory (RAM) 825 and read only memory (ROM) 830. Such memories include circuitry that allows information to be stored and retrieved. ROMs 830 generally contain stored data that cannot be modified. Data stored in RAM 825 can be read or changed by CPU 810 or other hardware devices. Access to RAM 825 and/or ROM 830 may be controlled by memory controller 820. Memory controller 820 may provide an address translation function that translates virtual addresses into physical addresses as instructions are executed. Memory controller 820 may also provide a memory protection function that isolates processes within the system and isolates system processes from user processes. Thus, a program running in user mode can access only memory mapped by its own process virtual address space; it cannot access memory within another process's virtual address space unless memory sharing between the processes has been set up.

In addition, computing system 800 may contain peripherals controller 835 responsible for communicating instructions from CPU 810 to peripherals, such as, printer 840, keyboard 845, mouse 850, and disk drive 855.

Display 865, which is controlled by display controller 863, is used to display visual output generated by computing system 800. Such visual output may include text, graphics, animated graphics, and video. Display 865 may be implemented with a CRT-based video display, an LCD-based flat-panel display, gas plasma-based flat-panel display, or a touch-panel. Display controller 863 includes electronic components required to generate a video signal that is sent to display 865. Further, computing system 800 may contain network adapter 870, which may be used to connect computing system 800 to an external communication network 160. Communications network 160 may provide computer users with means of communicating and transferring software and information electronically. Additionally, communications network 160 may provide distributed processing, which involves several computers and the sharing of workloads or cooperative efforts in performing a task. It will be appreciated that the network connections shown are exemplary and other means of establishing a communications link between the computers may be used.

Conclusion

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and equivalents thereof.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful mechanism for performing a search and a browse on a query. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A method of locating information sources in a network environment, comprising:
   providing a data structure comprising a plurality of nodes and a plurality of key phrases wherein each node relates to at least one key phrase and wherein each key phrase correspond to at least one web page;
   receiving a query containing at least one search term, the at least one search term having a first definition and a second definition, wherein the first and second definitions relate to different meanings of the at least one search term;
   searching the data structure for key phrases matching the search term, wherein the plurality of nodes are arranged in a hierarchical order such that a first node corresponding to the first definition and a second node corresponding to the second definition are lower in the hierarchy than a third node corresponding to the search term; and
   returning links for simultaneous display, wherein said links for simultaneous display comprise:
      a link to a plurality of web pages corresponding to the matching key phrases, and
      at least two links each link corresponding to one of at least two different nodes, a first of the at least two different nodes relating to the first definition and a second of the at least two different nodes relating to the second definition;
   whereby a user can select one of the links to the web pages or browse a selected one of the at least two links from the node to find other web pages related to the selected node.

2. The method recited in claim 1 wherein the data structure comprises a hierarchical data structure wherein the plurality of at least two nodes have a parent child relationship.

3. The method recited in claim 2 further comprising providing at least one link to a parent node of the at least two nodes whereby the user can browse on web pages related to the parent node.

4. The method as recited in claim 1 wherein each node may comprise a category.

5. The method as recited in claim 1 wherein each node may comprise a concept.

6. The method as recited in claim 1 wherein the web pages are maintained by web sites.

7. The method as recited in claim 6 wherein the web sites are part of an intranet.

8. The method as recited in claim 6 wherein the web sites are part of the Internet.

9. The method as recited in claim 1 wherein the data structure is maintained by a search engine.

10. The method as recited in claim 2 wherein the hierarchical data structure is a directed graph.

11. The method as recited in claim 1 wherein the query is a refined query selected from a set of nodes matching an initial search term.

12. A computer-readable medium bearing computer-readable instructions, the instructions comprising instructions for:
   providing a data structure comprising a plurality of nodes and a plurality of key phrases wherein each node relates to at least one key phrase and wherein each key phrase correspond to at least one web page;
   receiving a query containing at least one search term, the at least one search term having a first definition and a second definition, wherein the first and second definitions relate to different meanings of the at least one search term;
   searching the data structure for key phrases matching the search term, wherein the plurality of nodes are arranged in a hierarchical order such that a first node corresponding to the first definition and a second node corresponding to the second definition are lower in the hierarchy than a third node corresponding to the search term; and
   returning links for simultaneous display, wherein said links for simultaneous display comprise:
      a link to a plurality of web pages corresponding to the matching key phrases, and
      at least two links each link corresponding to one of at least two different nodes, a first of the at least two different nodes relating to the first definition and a second of the at least two different nodes relating to the second definition;
   whereby a user can select one of the links to the web pages or browse a selected one of the at least two links from the node to find other web pages related to the selected node.

13. A method for locating web sites in a computer network, comprising:
   providing a search term to a search engine, the search term having a first definition and a second definition, wherein the first and second definitions relate to different meanings of the search term;
   receiving from said search engine:
      a plurality of links to nodes related to the search term, wherein a first of the plurality of links to nodes relates to the first definition and a second of the plurality of links to nodes relates to the second definition, wherein the nodes are arranged in a hierarchical order such that a first node corresponding to the first definition and a second node corresponding to the second definition are lower in the hierarchy than a third node corresponding to the search term; and
      a plurality of links to web pages related to the search term; and
   simultaneously displaying the plurality of links to nodes related to the search term along with the plurality of links to web pages,
   whereby a user may select at least one link to a web page from the plurality of links to web pages to display the related web page and may select at least one link from the plurality of links to nodes related to the search term, wherein the selection of at least one link from the plurality of links to nodes results in the reception of a plurality of links to web pages related to the nodes.

14. The method as recited in claim 13 wherein said nodes comprise categories.

15. The method as recited in claim 13 wherein said nodes comprise concepts.

16. The method as recited in claim 13 wherein the further comprising receiving at least two links for broaden nodes, said broaden nodes having a parent-child relationship with one another wherein one of said broaden nodes has a relationship to the search term and wherein the other one of said broaden nodes has a parent relationship to the one of said broaden nodes whereby the user may select one of said broaden nodes to display at least one web page related to the selected broaden nodes.

17. The method as recited in claim 16 wherein the parent-child relationship is such that the parent node comprises web pages having a broader scope than the search term.

18. The method as recited in claim 13 wherein the web pages are maintained by a web site.

19. The method as recited in claim 18 wherein the web site is part of an intranet.

20. The method as recited in claim 18 wherein the web site is part of the Internet.

* * * * *